United States Patent Office 3,662,004
Patented May 9, 1972

3,662,004
PROCESS FOR PRODUCING HYDROXYALKYL MERCAPTANS
Wilfried Umbach, Langenfeld, Rainer Mehren, Neuss, and Werner Stein, Erkrath-Unterbach, Germany, assignors to Henkel & Cie. GmbH, Dusseldorf-Holthausen, Germany
No Drawing. Continuation-in-part of application Ser. No. 818,390, Apr. 22, 1969. This application Oct. 2, 1969, Ser. No. 863,387
Claims priority, application Germany, Apr. 23, 1968, P 11 68 264.3; Oct. 5, 1968, P 18 01 551.5
Int. Cl. C07c *149/18*
U.S. Cl. 260—609 R                                 17 Claims

ABSTRACT OF THE DISCLOSURE

Processes of reacting hydrogen sulfide with a mono or poly, terminal or non-terminal, aliphatic or cycloaliphatic epoxides having more than 3 carbon atoms in the presence of 0.01% to 10% by weight of a strongly basic catalyst in the temperature range of from −20° C. to 200° C. at normal to elevated pressures in order to obtain a hydroxyalkyl mercaptan containing more than 3 carbon atoms.

The novel products are higher molecular weight hydroxyalkyl mercaptans of the formula

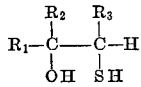

wherein $R_1$ is a member selected from the group consisting of alkyl having from 1 to 22 carbon atoms, alkylol having from 1 to 22 carbon atoms, alkoxyalkyl having from 2 to 22 carbon atoms, haloalkyl having from 1 to 22 carbon atoms, cycloalkylalkyl having from 6 to 22 carbon atoms and alkenyl having from 3 to 22 carbon, $R_2$ and $R_3$ are members selected from the group consisting of hydrogen and $R_1$ and, when taken together, alkylene having from 3 to 4 carbon atoms, with the proviso that the sum of the carbon atoms in $R_1$, $R_2$ and $R_3$ is from 6 to 22. The novel hydroxyalkyl mercaptans are useful as insecticides and fungicides, emulsifiers and intermediates in chemical synthesis.

PRIOR APPLICATIONS

This application is a continuation-in-part of our copending patent application Ser. No. 818,390, filed Apr. 22, 1969, now abandoned.

THE PRIOR ART

Several processes for the preparation of hydroxyalkyl mercaptans in considerable yields, by reacting lower molecular weight epoxides, such as ethylene oxide and propylene oxide, with hydrogen sulfide, are well known. However, preparation of hydroxyalkyl mercaptans containing more than 3 carbon atoms from the corresponding epoxides has been unsatisfactory. Until now, the higher molecular weight hydroxyalkyl mercaptans have been produced by preparing a solution of a solvent and a strong base, such as alkali metal or alkaline earth metal hydroxides or alkali metal alcoholates, and then reacting a corresponding epoxide with hydrogen sulfide in this solution. This method of preparing higher molecular weight hydroxyalkyl mercaptans on a commercial scale was too complicated and uneconomical since stoichiometric amounts of the strong bases had to be used, the reaction required long reaction periods, and the hydroxyalkyl mercaptans that were obtained were mixtures containing a considerable amount of bis(hydroxyalkyl)-sulfide, formed as a by-product of the reaction. The hydroxyalkyl mercaptan yields obtained by the prior art processes were small. The best results, recorded in J. Chem. Soc. [1948], p. 278, were obtained by reacting an epoxide with potassium hydrogen sulfide in stoichiometric amounts in an alcoholic solution. In this manner, 2-hydroxycyclohexyl mercaptan and 2-hydroxybutyl mercaptans were prepared from cyclohexene-oxide and butenoxide-2,3-in yields of 44% to 43% of theory, respectively, based on the epoxide used.

OBJECTS OF THE INVENTION

An object of the present invention is the development of a process for preparation of substantially pure higher molecular weight hydroxyalkyl mercaptans in good yield by the direct reaction of the corresponding epoxides with hydrogen sulfide.

Another object of the present invention is the development of a process for the preparation of hydroxyalkyl mercaptans containing more than 3 carbon atoms which consists essentially of the steps of reacting an epoxide having more than 3 carbon atoms selected from the group consisting of mono-vicinal epoxides and poly-vicinal epoxides with at least the stoichiometric amount of hydrogen sulfide at a temperature of from −20° C. to 200° C. at normal to elevated pressures in the presence of from 0.01% to 10% by weight, based on the weight of said epoxide, of a strongly basic catalyst, and recovering said hydroxyalkyl mercaptan containing more than 3 carbon atoms.

A further object of the invention is the development of a process for the preparation of hydroxyalkyl mercaptans containing more than 5 carbon atoms which consists essentially of the steps of reacting an epoxide of the formula

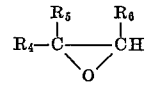

wherein $R_4$ is a member selected from the group consisting of hydrogen, alkyl having from 1 to 22 carbon atoms, alkylol having from 1 to 22 carbon atoms, alkoxyalkyl having from 2 to 22 carbon atoms, cycloalkylalkyl having from 6 to 22 carbon atoms and alkenyl having from 3 to 22 carbon atoms, $R_5$ and $R_6$ are members selected from the group consisting of $R_1$ and, when taken together, alkylene having from 3 to 4 carbon atoms, with the proviso that at least one of $R_4$, $R_5$ and $R_6$ is other than hydrogen and that the sum of the carbon atoms in $R_4$, $R_5$ and $R_6$ is from 4 to 22, with at least the stoichiometric amount of hydrogen sulfide at a temperature of from −20° C. to 200° C. at normal to elevated pressures in the presence of from 0.01% to 10% by weight, based on the weight of said epoxide, of a strongly basic catalyst, and recovering said hydroxyalkyl mercaptan containing more than 5 carbon atoms.

A still further object of the invention is the development of a process for the preparation of hydroxyalkyl mercaptans containing more than 3 carbon atoms by reacting a corresponding epoxide with substantially equimolar amount of hydrogen sulfide at a temperature of from −20° C. to 40° C. at normal pressures in the presence of from 0.01% to 10% by weight, based on the weight or said epoxide, of a strongly basic catalyst.

A yet further object of this invention is the development of a process for the preparation of hydroxyalkyl mercaptans containing more than 3 carbon atoms by reacting a corresponding epoxide with at least 1.5 times the stoichiometric amount of hydrogen sulfide at a temperature of from 40° C. to 200° C. at elevated pressures in the presence of from 0.01% to 10% by weight, based on the weight of said epoxide, of a strongly basic catalyst.

3

Another object of the present invention is the obtaining of hydroxyalkyl mercaptans of the formula

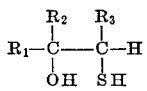

wherein $R_1$ is a member selected from the group consisting of alkyl having from 1 to 22 carbon atoms, alkylol having from 1 to 22 carbon atoms, alkoxyalkyl having from 2 to 22 carbon atoms, haloalkyl having from 1 to 22 carbon atoms, cycloalkylalkyl having from 6 to 22 carbon atoms and alkenyl having from 3 to 22 carbon atoms, $R_2$ and $R_3$ are members selected from the group consisting of hydrogen and $R_1$ and, when taken together, alkylene having from 3 to 4 carbon atoms, with the proviso that the sum of the carbon atoms in $R_1$, $R_2$ and $R_3$ is from 6 to 22.

These and other objects of the invention will become more apparent as the description thereof proceeds.

DESCRIPTION OF THE INVENTION

The drawbacks of the prior art have been overcome and the above objects have been achieved by the discovery of a process for the preparation of hydroxyalkyl mercaptans containing more than 3 carbon atoms which consists essentially of the steps of reacting an epoxide having more than 3 carbon atoms selected from the group consisting of mono-vicinal epoxides and polyvicinal epoxides with at least the stoichiometric amount of hydrogen sulfide at a temperature of from —20° C. to 200° C. at normal to elevated pressures in the presence of from 0.01% to 10% by weight, based on the weight of said epoxide, of a strongly basic catalyst; and recovering said hydroxyalkyl mercaptan containing more than 3 carbon atoms.

A preferred embodiment of the invention involves a process for the preparation of hydroxyalkyl mercaptans containing more than 5 carbon atoms which consists essentially of the steps of reacting an epoxide of the formula

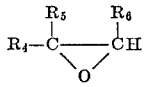

wherein $R_4$ is a member selected from the group consisting of hydrogen, alkyl having from 1 to 22 carbon atoms, alkylol having from 1 to 22 carbon atoms, alkoxyalkyl having from 2 to 22 carbon atoms, cycloalkylalkyl having from 6 to 22 carbon atoms and alkenyl having from 3 to 22 carbon atoms, $R_5$ and $R_6$ are members selected from the group consisting of $R_1$ and when taken together, alkylene having from 3 to 4 carbon atoms, with the proviso that at least one of $R_4$, $R_5$ and $R_6$ is other than hydrogen and that the sum of the carbon atoms in $R_4$, $R_5$ and $R_6$ is from 4 to 22, with at least the stoichiometric amount of hydrogen sulfide at a temperature of from —20° C. to 200° C. at normal to elevated pressures in the presence of from 0.01% to 10% by weight based on the weight of said epoxide, of a strongly basic catalyst; and recovering said hydroxyalkyl mercaptan containing more than 5 carbon atoms.

The processes of the invention result in novel high molecular weight hydroxyalkyl mercaptans of the formula

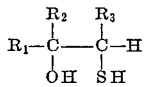

wherein $R_1$ is a member selected from the group consisting of alkyl having from 1 to 22 carbon atoms, alkylol having from 1 to 22 carbon atoms, alkoxyalkyl having from 2 to 22 carbon atoms, haloalkyl having from 1 to 22 carbon atoms, cycloalkylalkyl having from 6 to 22 carbon atoms and alkenyl having from 3 to 22 carbon atoms, $R_2$ and $R_3$ are members selected from the group consisting of hydrogen and $R_1$ and, when taken together, alkylene having from 3 to 4 carbon atoms, with the proviso that the sum of the carbon atoms in $R_1$, $R_2$ and $R_3$ is from 6 to 22.

The process for the preparation of hydroxyalkyl mercaptans containing more than 3 carbon atoms involves (1) the reaction between a corresponding epoxide having more than 3 carbon atoms and hydrogen sulfide at a temperature of —20° C. and 40° C., preferably 0° C. to 30° C. in the presence of from 0.01% to 10% by weight, based on the weight of said epoxide, of a strongly basic catalyst, where the reaction of the epoxide with hydrogen sulfide is preferably carried out under normal pressure on substantially equimolar basis, or (2) the reaction between a corresponding epoxide having more than 3 carbon atoms with an excess of hydrogen sulfide which amounts to at least 1.5 times the stoichiometrically required amount, in the presence of from 0.01% to 10% by weight, based on the weight of said epoxide, of a strongly basic catalyst at a temperature of 40° C. to 200° C., preferably 80° C. to 150° C., under pressure.

The strongly basic catalysts are preferably added in an amount from 0.05% to 7% by weight, based on the weight of the epoxide. These strongly basic catalysts may be inorganic, such as alkali metal or alkaline earth metal hydroxides or organic such as alkali metal lower alcoholates, for example, sodium methylate, sodium ethylate, etc.; alkali metal phenolates, such as sodium phenolate, etc.; tertiary onium bases, such as sulfonium hydroxides, for example, trimethylsulfonium hydroxide, tris-(β-hydroxyethyl)-sulfonium hydroxide, dodecyldimethylsulfonium hydroxide, etc.; quaternary onium bases, such as phosphonium hydroxides, for example, tetramethylphosphonium hydroxide, etc., and especially quaternary ammonium hydroxides, for example, tetraethylammonium hydroxide, benzyltrimethylammonium hydroxide, etc., and the dimethylates of the reaction product obtained, of the reaction in a methanolic solution of 1 mol of N,N,N',N'-tetramethylhexamethylene diamine with 3 mols of propyleneoxide. Weak bases such as hydrazine or amines are less suitable as catalysts due to their lower basicities.

Monoepoxy and polyepoxy, terminal or non-terminal aliphatic epoxides can be used in the invention as starting materials. The aliphatic epoxides can be straight or branched chained, or may be interrupted or substituted in the alkyl chains by hetero atom groups. Moreover, monoepoxy or multipoxy, substituted or unsubstituted cycloaliphatic epoxides can be used. Also, mixtures of various epoxides can be utilized, as well as mixtures, which have, in addition to epox gyroups, additional functional groups which are inert to hydrogen sulfide. Such mixtures can be, for instance, epoxidized cracked olefins, in which, in addition to various epoxides, paraffins and non-reacted olefins can be present. Furthermore, epoxidized fatty acid and fatty alcohol mixtures which can be obtained from natural unsaturated fats and oils may be utilized.

Preferably, epoxides with 6 to 24 carbon atoms or the corresponding mixtures are utilized. These epoxides are alkene-vic.-oxides having 6 to 24 carbon atoms, for example, n - octane - oxide-1,2; n-tetraconsene-oxide-1,2; 2 - ethylhexeneoxide - 1,2; n-octene-oxide-2,3, etc.; alkadiene-di-vic.-oxides having 6 to 24 carbon atoms, for example, n-octadiene-dioxide-1,2,-7,8, etc.; lower alkyl esters of vic.-epoxy-alkanoic acids having from 6 to 24 carbon atoms, for example, methyl - 9,10-epoxy-octadecanoate, etc.; alkoxy-alkene-vic.-oxides having from 6 to 24 carbon atoms, for example, 2-ethylhexyl-glycidyl-ether, etc.; hydroxyalkene-vic.-oxides having from 6 to 24 carbon atoms, for example, 2,3-epoxyoctanol-4, etc.; and cycloalken-vic.-oxides having from 6 to 24 carbon atoms, for example, cyclohexene-vic.-oxide and cyclododecene-vic.-oxide.

Starting epoxide materials may be prepared by epoxidization of the corresponding olefinically unsaturated compounds with peracetic acid for instance.

The products prepared by the process here described are obtained in a pure form and high yields on the basis of the epoxide employed.

Novel β-hydroxyalkyl mercaptans are obtained from epoxides of the formula

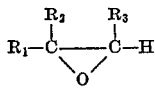

wherein $R_1$ is a member selected from the group consisting of alkyl having from 1 to 22 carbon atoms, alkylol having from 1 to 22 carbon atoms, alkoxyalkyl having from 2 to 22 carbon atoms, haloalkyl having from 1 to 22 carbon atoms, cycloalkylalkyl having from 6 to 22 carbon atoms, and alkenyl having from 3 to 22 carbon atoms, $R_2$ and $R_3$ are members selected from the group consisting of hydrogen and $R_1$ and, when taken together, alkylene having from 3 to 4 carbon atoms, with the proviso that the sum of the carbon atoms in $R_1$, $R_2$ and $R_3$ is from 6 to 22.

No solvent is necessary in order to effect the reaction, although, it sometimes may be advantageous, as in the case of a highly viscous reaction mixture, to add solvents. Appropriate solvents are, above all, polar substances, for instance, lower alkanols such as methanol, ethanol, propanol; ethers, such as diethylether, dioxane; as well as various ethylene glycol ether types known by their commercial name of "Cellosolves." Also suitable are dimethylformamide and dimethylsulfoxide. The amount of solvent that can be used can vary to a large extent and may be, for example, from 50% to 150% by weight based on the amount of epoxide employed.

When conducting the reaction at lower temperatures and normal pressures, the strongly basic catalysts may be mixed with the epoxide before addition of the hydrogen sulfide and the mixture is then heated to the reaction temperature, at which time, continuous introduction of hydrogen sulfide into the reaction mixture is commenced. It is desirable to maintain the mixture at the reaction temperature until the reaction is completed. This can be achieved by controlling the rate of addition of hydrogen sulfide. Generally, hydrogen sulfide is added to the mixture while agitating the same in an amount that the reaction mixture can absorb. The end of the reaction is apparent when evolution of the reaction heat subsides and is completed when the mixture does not absorb any more of hydrogen sulfide. The duration of the reaction is up to several hours, and more specifically, is from 2 to 3 hours. During the reaction, the temperature must be carefully controlled since the yield of hydroxyalkyly mercaptane will be effected if the temperateur is permitted to rise above about 40° C., unless pressure is employed.

In carrying out the reaction, the epoxide may be mixed with the solvent and the mixture heated to the desired reaction temperature, at which time, hydrogen sulfide may be added with agitation in an amount the reaction mixture can absorb. The remaining phases of the reaction are similar to what was described above.

When using a solvent, the process described above can be modified in such a manner that the basic catalyst is mixed with solvent or a mixture of the solvents and the epoxide is added dropwise while simultaneously introducing hydrogen sulfide. Upon completion of the reaction, the products are recovered and purified in a conventional manner. This may be achieved by distillation after neutralizing the basic catalyst with a dilute acid and separation of the aqueous and organic phases. The organic phase is fractionated to obtain a refined product.

When conducting the reaction at higher temperatures and elevated pressures, the ratio between epoxide and hydrogen sulfide should be so adjusted that at least 1.5 mols of hydrogen sulfide are used per mol of epoxide group. A ratio of 3 to 6 mols of hydrogen sulfide per mol of epoxide group is preferred. The use of a larger excess of hydrogen sulfide is indeed possible within the scope of the process according to the invention, but it has no special advantageous and is, therefore, not to be recommended for economic reasons.

The reaction of the epoxides with hydrogen sulfide is carried out under pressure, and an excess pressure of at least one atmosphere, and preferably 10 to 50 atmospheres, should be maintained in the reactor. With a suitable design of the reaction apparatus, however, higher pressures may also be used. Hydrogen sulfide mixtures with inert gas in which the content of hydrogen sulfide fulfills the conditions described above for the ratio between epoxide and hydrogen sulfide may also be used.

The above reaction may be carried out discontinuously or continuously.

In the case of the discontinuous process, epoxide, strongly basic catalyst, and optionally solvent, may be placed, for example, in an autoclave and the required amount of hydrogen sulfide added in liquid form. The reaction mixture is then heated to the desired reaction temperature, and adjusted to a pressure which is determined by the volume of the autoclave, the quantity of the reactants and the temperature.

It is also possible to introduce under pressure the necessary amount of hydrogen sulfide, possibly by the aid of an inert gas, into the epoxide-catalyst mixture in the autoclave.

For the continuous process, the usual pressure hydrogenation apparatus with circulation of gas and a pressure separator, for example, may be used, in which the epoxide mixed with strongly basic catalyst is allowed to run over inert fillers in an atmosphere of hydrogen sulfide in a heated pressure oven. The catalyst-containing epoxide may also be sprayed into a heated pressure chamber, but here again, the conditions for the ratio between hydrogen sulfide and epoxide are to be observed.

The working up of the catalyst-containing products may be carried out by first neutralizing the catalyst with dilute acid, separating the aqueous phase possibly after addition of a water-insoluble solvent, and working up the organic phase by distillation.

Since the reaction between higher molecular weight epoxides and hydrogen sulfide results in water-insoluble products, these products can be recovered by introducing the reaction mixture into ice water and purifying the insoluble phase by recrystallization.

The hydroxyalkyl mercaptans described herein can be used for various purposes. They can be used in the control of pests as insecticides and fungicides. They are effective antioxidants for rubber formulations. They can be used furthermore as emulsifiers. They are valuable starting materials for numerous syntheses, on the basis of their polyfunctionality. Of particular interest are their transester and transether products which, according to the selection of the reaction partner, may be employed in the field of washing and textile treatment, as prewashing and dispersing agents, and as plasticizers in the plastics industry, or as additives to lubricant oils and lubricant materials.

The following specific examples are illustrative of the invention and are not to be construed as being in any way limitative thereof.

EXAMPLE 1

80 ml. of methanol were mixed with 3.1 gm. (6.7% by weight, based on the epoxide) of benzyltrimethylammonium hydroxide and the solution was saturated at 25° with hydrogen sulfide. Subsequently, within 45 minutes, 46.1 gm. (0.25 mol) of n-dodecenoxide-1,2 were added dropwise. Hydrogen sulfide was added continuously, the amount of hydrogen sulfide being as much as the reaction mixture could absorb. Addition of hydrogen sulfide was adjusted by reference to a bubble counter. The temperature of the reaction was maintained at 25° C. After the addition of epoxide had been completed, the reaction mixture continued to absorb hydrogen sulfide for another hour, and the temperature of 25° C. was maintained. Subsequently, the catalyst was neutralized with dilute sulfuric acid. After adding ether, the aqueous phase was separated, and the organic phase was subjected to fractional distillation. A fraction with a refractive index of $n_D^{25}=1.4716$ was obtained, boiling at 114° C./0.03 mm. Hg and whose analysis data accorded with the values computed for 2-hydroxydodecyl mercaptan. This fraction was obtained in a yield of 90% of the theory, based on the epoxide used. The constitution adopted was confirmed by the nuclear resonance spectrum.

The analysis data was as follows:

Calculated (percent): C, 65.99; H, 12.00; O, 7.33; S, 14.68. Found (percent): C, 65.92; H, 12.23; O, 7.65; S, 14.53.

OH-number: (OH+SH) Calculated: 513.6. Found: 505.7.

The osmometric molecular weight determination in acetone revealed a molecular weight of 219.5 (calculated value 218.4).

EXAMPLE 2

46.1 gm. (0.25 mol) of n-dodecenoxide-1,2-were reacted with 3.1 gm. (6.7% by weight, with respect to the epoxide used) of sodium ethylate, while hydrogen sulfide was introduced, with agitation of the reaction mixture, in an amount that the reaction mixture was able to absorb. Addition of hydrogen sulfide was adjusted by reference to a bubble counter. During the reaction, the temperature was kept at 25° C. by cooling the reaction mixture. Reaction was terminated after 3 hours. Recovery and purification of the reaction mixture was effected as in Example 1. 34.4 gm. (yield 63% of theory) of 2-hydroxydodecyl mercaptan, having a refractive index of $n_D^{25}=1.4712$, a boiling point of 108° to 110° C./0.009 mm. Hg was recovered.

EXAMPLE 3

5.7 gm. of barium hydroxide-octahydrate (6.7% by weight of active catalyst, with respect to epoxide) were dissolved in 100 ml. ethanol (70%). The solution was saturated at 26° C. with hydrogen sulfide, and subsequently, 46.1 gm. (0.25 mol) of n-dodecaneoxide-1,2 were added dropwise within 45 minutes. Constantly, hydrogen sulfide was added to such an extent, during the epoxide addition, as the reaction mixture accepted it for the reaction. After the addition of epoxide was terminated, hydrogen sulfide was accepted for another 45 minutes. By means of cooling, the reaction temperature was kept for the total of the reaction period at 26° C. After the reaction was completed, the reaction mixture was reworked according to Example 1. 2-hydroxydodecyl mercaptan was obtained in a yield of 87% of the theory. The following was the physical characteristic data:

Boiling point=114° C./0.03 mm. Hg.
Refractive index $n_D^{25}=1.4716$.

The molecular weight of 219.0 found osmometrically in acetone accorded well with the computed value of 218.4.

EXAMPLE 4

Hydrogen sulfide was introduced into a solution of 0.51 gm. of sodium hydroxide (1% by weight of the epoxide) in 80 ml. of methanol at 30° C. 51.3 gm. (0.4 mol) of n-octenoxide-1,2 were added to this solution within 1 hour in such a manner that the reaction mixture was able to absorb it. The temperature was kept at 30° C. After the epoxide addition was terminated, the reaction mixture absorbed hydrogen sulfide for another 2½ hours. The temperature of 30° C. was continuously maintained. The subsequent extraction of the product from the reaction mixture was effected as in Example 1. The yield of 2-hydroxyoctyl mercaptan was 79% of theory, with respect to the epoxide employed. The product had its melting point at 80° C./0.15 mm. Hg, and the following analysis data:

Calculated (percent): C, 59.20; H, 11.18; S, 19.76.
Found (percent): C, 59.38; H, 11.38; S, 19.32.

EXAMPLE 5

In a similar way to that in Example 4, 67.1 gm. (0.25 mol) of n-octadecenoxide-1,2 were reacted with hydrogen sulfide in the presence of 0.67 gm. of sodium hydroxide (1% by weight of the epoxide) in 80 ml. of methanol. 2-hydroxyoctadecyl mercaptan with a melting point of 52° to 57° C. was obtained in a yield of 67% of theory. After recrystallizing twice from petroleum ether (boiling point 60° to 95° C.) the product had a melting point of 56° to 58° C. and the following analysis values:

Calculated (percent): C, 71.45; H, 12.66; S, 10.60.
Found (percent): C, 71.40; H, 12.95; S, 10.37.

EXAMPLE 6

73.7 gm. (0.4 mol) of n-dodeceneoxide-1,2 and 1.5 gm. (2% by weight, based on the epoxide) of sodium ethylate were placed in an autoclave of 500 ml. capacity, which was equipped with a magnetic stirrer. Then 50 gm. (1.5 mols) of liquid hydrogen sulfide were added. The contents of the autoclave were heated to 100° C. and maintained at this temperature for 6 hours. During the reaction the pressure was in the range from 21 to 24 atmospheres. After the end of the reaction, the excess hydrogen sulfide was removed by evaporating at a normal pressure and the reaction mixture was taken up in ether. The catalyst was neutralized by addition of dilute sulfuric acid. The aqueous phase was separated and the organic phase was worked up by distillation. The yield of 1-mercapto-2-hydroxydodecane amounted to 78%, based on the epoxide used. The product had a refractive index of $n_D^{25}=1.4715$ and OH value (OH+SH) of 519.4 (calculated value 513.6).

EXAMPLE 7

A solution of 44.9 gm. (0.35 mol) of n-octeneoxide-2,3, 0.3 gm. (0.7% by weight, based on the epoxide) of sodium ethylate and 45 gm. of ethanol, after addition of 50 gm. (1.5 mols) of hydrogen sulfide, was heated for 6 hours at 100° C. as in Example 6. The reaction mixture was worked up as in Example 6. The hydroxyoctylmercaptan obtained in 79% yield was found from the nuclear magnetic resonance spectrum to be a mixture of the 2-hydroxy - 3-mercapto-octane and 2-mercapto-3-hydroxyoctane-isomers. The analysis data for the product were:

Calculated (percent): C, 59.20; H, 11.18; S, 19.76.
Found (percent): C, 59.84; H, 11.60; S, 19.42.

OH value (OH+SH): Calculated: 691.4. Found: 679.4.

EXAMPLE 8

In the process as described in Example 6, a solution of 49.1 gm. (0.5 mol) of cyclohexene oxide, 49.1 gm. of methanol and 0.49 gm. (1% by weight, based on the epoxide) of benzyltrimethyl-ammonium hydroxide, after addition of 60 gm. (1.8 mols) of hydrogen sulfide was heated for 6 hours at 120° C. The pressure was in the range from 26 to 28 atmospheres during the reaction. The reaction mixture was worked up as in Example 6. 47.6 gm. of 1-mercapto-2-hydroxy-cyclohexane were obtained, corresponding to a yield of 72% of theory, based on the epoxide used.

OH value ,OH+SH): Calculated: 848.7. Found: 833.7.

EXAMPLE 9

40 gm. (1.18 mols) of liquid hydrogen sulfide were added to a solution of 53.7 gm. (0.2 mol) of n-octadeceneoxide-1,2, 80 gm. of ethanol and 0.54 gm. of potassium hydroxide (1% by weight, based on the epoxide), in an autoclave of 0.5 liter capacity (equipped with magnetic stirring). The reaction was carried out at 120° C. for 6 hours (pressure, 23 atmospheres). After separation of the excess hydrogen sulfide, solvent and catalyst, 2-hydroxyoctadecyl mercaptan with a melting point of 49° to 53° C. was obtained in a yield of 73% of theory on working up the product by distillation. The recrystallized product melted at 56° to 58° C.

The present invention has the special advantages that hydroxyalkyl mercaptans with more than 3 carbon atoms may be made available in a pure form by an economically operated process with high yields. A further advantage of the invention is that long-chain epoxides, especially those with non-terminal epoxide groups, can be reacted with hydrogen sulfide in the process of the invention without special expenditure on apparatus and with a high degree of reaction with at the same time a relatively short reaction period.

The invention is also characterized by novel higher molecular weight hydroxyalkyl mercaptans which can be prepared from epoxides having their origin in olefins and unsaturated alcohols.

Various modifications of the herein described novel compounds and the process for their preparation may be made without departing from the spirit of the invention.

We claim:

1. A process for the preparation of hydroxyalkyl mercaptans containing more than 5 carbon atoms which consists essentially of the steps of reacting an epoxide of the formula

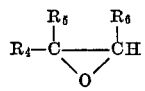

wherein $R_4$ is a member selected from the group consisting of hydrogen, alkyl having from 1 to 22 carbon atoms, alkylol having from 1 to 22 carbon atoms, alkoxyalkyl having from 2 to 22 carbon atoms, cycloalkylalkyl having from 6 to 22 carbon atoms and alkenyl having from 3 to 22 carbon atoms, $R_5$ and $R_6$ are members selected from the group consisting of $R_1$ and, when taken together, alkylene having from 3 to 4 carbon atoms, with the proviso that at least one of $R_4$, $R_5$ and $R_6$ is other than hydrogen and that the sum of the carbon atoms in $R_4$, $R_5$ and $R_6$ is from 4 to 22, with substantially the stoichiometric amount of hydrogen sulfide at a temperature of from $-20°$ C. to $40°$ C. at normal pressure in the presence of from 0.01% to 10%, based on the weight of said epoxide, of a strongly basic catalyst selected from the group consisting of alkali metal hydroxides, alkaline earth metal hydroxides, alkali metal lower alkanolates, alkali metal phenolates, tertiary onium hydroxides and quaternary onium hydroxides; and recovering said hydroxyalkylmercaptan containing more than 5 carbon atoms.

2. The process of claim 1 wherein said temperature is in the range of from 0° to 30° C.

3. The process of claim 1 wherein said strongly basic catalyst is present in an amount of from 0.05% to 7% by weight, based on said epoxide.

4. The process of claim 1 wherein said epoxides have from 8 to 24 carbon atoms.

5. The process of claim 4 wherein said epoxides are alkene-oxides-1,2 having from 8 to 24 carbon atoms.

6. The process of claim 1 including the step of adding a solvent to the reaction mixture to facilitate the reaction between said epoxide and hydrogen sulfide.

7. The process of claim 6 wherein the amount of said solvent is between 50% and 150% by weight, based on said epoxide.

8. The process of claim 6 including the step of mixing said epoxide with said solvent prior to reacting said epoxide with hydrogen sulfide.

9. The process of claim 6 including the steps of mixing said basic catalyst with said solvent, and adding said epoxide while simultaneously, continuously introducing hydrogen sulfide into the reaction mixture.

10. The process of claim 9 wherein hydrogen sulfide is added in an amount that the reaction mixture is capable of absorbing.

11. The process of claim 10 including the step of agitating the reaction mixture while adding hydrogen sulfide.

12. A process for the preparation of hydroxyalkyl mercaptans containing more than 5 carbon atoms which consists essentially of the steps of reacting an epoxide of the formula

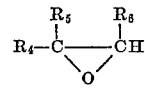

wherein $R_4$ is a member selected from the group consisting of hydrogen, alkyl having from 1 to 22 carbon atoms, alkylol having from 1 to 22 carbon atoms, alkoxyalkyl having from 2 to 22 carbon atoms, cycloalkylalkyl having from 6 to 22 carbon atoms and alkenyl having from 3 to 22 carbon atoms, $R_5$ and $R_6$ are members selected from the group consisting of $R_1$ and, when taken together, alkylene having from 3 to 4 carbon atoms, with the proviso that at least one of $R_4$, $R_5$ and $R_6$ is other than hydrogen and that the sum of the carbon atoms in $R_4$, $R_5$ and $R_6$ is from 4 to 22, with at least 1.5 times the stoichiometric amount of hydrogen sulfide at a temperature of from 40° C. to 200° C. under superatmospheric pressures in the presence of from 0.01% to 10%, based on the weight of said epoxide of a strongly basic catalyst selected from the group consisting of alkali metal hydroxide, alkaline earth metal hydroxides, alkali metal lower alkanolates, alkali metal phenolates, tertiary onium hydroxides and quaternary onium hydroxides; and recovering said hydroxyalkylmercaptan containing more than 5 carbon atoms.

13. The process of claim 12 wherein said temperature is between 80° C. and 150° C. and the pressure is between 10 and 50 atmospheres.

14. The process of claim 13 wherein said hydrogen sulfide is employed in an amount of from 3 to 6 times the stoichiometric amount.

15. The process of claim 12 wherein said strongly basic catalyst is present in an amount of from 0.05% to 7% by weight, based on said epoxide.

16. The process of claim 12 including the step of adding a solvent to the reaction mixture to facilitate the reaction between said epoxide and hydrogen sulfide.

17. The process of claim 12 wherein the amount of said solvent is between 50% and 150% by weight, based on said epoxide.

References Cited

UNITED STATES PATENTS

| | | | |
|---|---|---|---|
| 3,086,997 | 4/1963 | Warner | 260—609 A |
| 3,394,192 | 7/1968 | Jones | 260—609 A |

FOREIGN PATENTS

| | | | |
|---|---|---|---|
| 988,135 | 1965 | Great Britain | 260—609 A |

OTHER REFERENCES

Culvenor et al.: "J. Chem. Soc." (1949), pp. 278–81.

JOSEPH REBOLD, Primary Examiner

D. R. PHILLIPS, Assistant Examiner

U.S. Cl. X.R.

252—48.2, 351; 260—348.5 R, 609 D; 424—335